US008509223B2

(12) United States Patent
Mehta et al.

(10) Patent No.: US 8,509,223 B2
(45) Date of Patent: *Aug. 13, 2013

(54) METHOD AND SYSTEM FOR AUTHENTICATED FAST CHANNEL CHANGE OF MEDIA PROVIDED OVER A DSL CONNECTION

(75) Inventors: Hemang Mehta, Foster City, CA (US); Don Camacho, Occidental, CA (US); Gabor Fencsik, Berkeley, CA (US); Greg Bathrick, Santa Rosa, CA (US)

(73) Assignee: WI-LAN, Inc., Ottawa, Ontario (CA)

( * ) Notice: Subject to any disclaimer, the term of this patent is extended or adjusted under 35 U.S.C. 154(b) by 162 days.

This patent is subject to a terminal disclaimer.

(21) Appl. No.: 12/871,510

(22) Filed: Aug. 30, 2010

(65) Prior Publication Data

US 2010/0322235 A1 Dec. 23, 2010

Related U.S. Application Data

(63) Continuation of application No. 10/870,677, filed on Jun. 16, 2004, now Pat. No. 7,809,010, which is a continuation of application No. 10/187,391, filed on Jun. 28, 2002, now Pat. No. 6,763,019.

(60) Provisional application No. 60/362,156, filed on Mar. 5, 2002.

(51) Int. Cl.
*H04L 12/66* (2006.01)
(52) U.S. Cl.
USPC .......................................... 370/352; 370/390

(58) Field of Classification Search
USPC ................. 370/252, 389, 395, 463, 432, 352; 709/225, 229; 725/120; 713/182
See application file for complete search history.

(56) References Cited

U.S. PATENT DOCUMENTS

| 6,044,403 A | 3/2000 | Gerszberg et al. |
| 6,081,517 A | 6/2000 | Liu et al. |
| 6,212,561 B1* | 4/2001 | Sitaraman et al. ............ 709/225 |
| 6,522,668 B1 | 2/2003 | Singleton et al. |
| 6,614,765 B1 | 9/2003 | Bruno et al. |
| 6,745,392 B1* | 6/2004 | Basawapatna et al. ....... 725/120 |
| 6,763,019 B2 | 7/2004 | Mehta et al. |

(Continued)

FOREIGN PATENT DOCUMENTS

| EP | 0 928 123 | 7/1999 |
| JP | 2002-064587 | 2/2002 |

(Continued)

OTHER PUBLICATIONS

European Search Report, EP 03708369, 5 pages (Aug. 8, 2007).

(Continued)

*Primary Examiner* — Asad Nawaz
*Assistant Examiner* — Parth Patel
(74) *Attorney, Agent, or Firm* — Volpe and Koenig, P.C.

(57) ABSTRACT

An apparatus, system and method are disclosed for fast channel changes of media that is provided by a carrier over a local loop connection to a subscriber, where subscriber information is stored at the access node that supports the local loop connection to the subscriber, and the access node supports multicast protocols so that only one instance of a channel may be provided on the core network regardless of how many subscribers have requested access to the channel.

22 Claims, 9 Drawing Sheets

(56) References Cited

U.S. PATENT DOCUMENTS

| | | | |
|---|---|---|---|
| 6,973,095 B1 * | 12/2005 | Carrel et al. | 370/463 |
| 7,177,318 B2 | 2/2007 | Nguyen et al. | |
| 7,197,010 B1 * | 3/2007 | Berstein et al. | 370/252 |
| 7,245,614 B1 * | 7/2007 | Podar et al. | 370/389 |
| 7,809,010 B2 * | 10/2010 | Mehta et al. | 370/432 |
| 2001/0019559 A1 | 9/2001 | Handler et al. | |
| 2002/0016831 A1 | 2/2002 | Peled et al. | |
| 2002/0026645 A1 | 2/2002 | Son et al. | |
| 2002/0097728 A1 * | 7/2002 | Hinderks et al. | 370/395.52 |
| 2002/0188736 A1 * | 12/2002 | Jarvensivu | 709/229 |
| 2004/0213252 A1 | 10/2004 | Lee et al. | |
| 2006/0143466 A1 * | 6/2006 | Muller et al. | 713/182 |
| 2006/0239254 A1 * | 10/2006 | Short et al. | 370/352 |

FOREIGN PATENT DOCUMENTS

| | | |
|---|---|---|
| WO | 99/63759 | 12/1999 |
| WO | 01/35240 | 5/2001 |
| WO | 01/95569 | 12/2001 |
| WO | 01/98920 | 12/2001 |

OTHER PUBLICATIONS

Fenner, "RFC 2236 Internet Group Management Protocol, Version 2," Nov. 30, 1997, [online]Retrieved from the Internet <URL:http://www.faqs.org/ftp/rfc/pdf/rfc2236.txt.pdf>.

* cited by examiner

METHOD AND SYSTEM FOR AUTHENTICATED FAST CHANNEL CHANGE OF MEDIA PROVIDED OVER A DSL CONNECTION

CROSS REFERENCE TO RELATED APPLICATIONS

This application is a continuation of U.S. patent application Ser. No. 10/870,677, filed Jun. 16, 2004, which issued as U.S. Pat. No. 7,809,010 on Oct. 5, 2010, and which is a continuation of U.S. patent application Ser. No. 10/187,391, filed Jun. 28, 2002, which issued as U.S. Pat. No. 6,763,019 on Jul. 13, 2004, and which claims the benefit of U.S. provisional application No. 60/362,156, filed Mar. 5, 2002, which are incorporated by reference as if fully set forth.

FIELD OF INVENTION

The present disclosure relates to enabling a subscriber to access media over a local loop connection, and more particularly relates to enabling a subscriber to quickly change channels of media provided over a local loop connection.

BACKGROUND

Telephone carriers used to use residential telephone lines primarily to provide voice services to customers. For entertainment, customers typically went outside the home, to movie theatres, to restaurants or parks. Broadcast television was the staple diet for channeling entertainment to homes. The cable industry was nascent and consisted primarily of positioning a big antenna and hooking up line amplifiers to feed the received signals to multiple homes. At that time, telephone carriers were satisfied that their share of the voice services market was unchallenged. The cable operators were too small and too specialized to be of much interest.

Today, the predominant service offered by telephone carriers is still voice services. However the boundary between the cable industry and the telecommunication industry is blurring. Cable companies have not stopped at delivering entertainment media. In particular, they are also delivering data services through cable modems and indicated their intentions to compete with the telephone carriers in the delivery of voice services to residential customers.

As technology has advanced, telephone wires and cable wires to homes have become exactly that, wires. What makes each wire different from any other wire is the services that it can provide to customers. In turn, the service that a wire provides determines its importance and value. The more services a single wire can provide a customer, the more valuable the wire is. Thus, separate wires to a home for each type of service has become less important and is often unnecessary.

Over time, the type of access point/connection to the home has become less important than the services it can provide. While it is possible to evaluate the group psyche and examine human behavior issues to try and determine why predominantly entertainment industries such as cable companies and Internet companies have seen exponential growth patterns, that is not the purpose of this discussion. However, it is important to note that the growth numbers indicate that a mass-market consumer audience when correlated to entertainment has resulted in a market segment that is profitable and is growing. An observation validated by the emergence of cable and Internet companies from humble beginnings to huge conglomerates today.

That observation has two parts. The first part is the growth of a mass-market consumer audience for entertainment provided to the home. The second part is that entertainment has played an equally important role in the emergence of an entirely new revenue sector.

Entertainment can be visual and aural, such as video or movies. Purely visual entertainment can take the form of a book, magazine or newspaper. Aural entertainment can include music, commentary, news broadcasts, and the like. The emergence of an open format for the exchange of visual entertainment over the Internet has been one of the corner stones in the emergence and establishment of dominant online service providers. Entertainment as described above does not differentiate it from information and pure entertainment. However, the differentiator between information and entertainment is more qualitative and subjective. The scope of delivery of these is not necessarily different. Hence, collectively, both visual and aural entertainment can be referred to as media.

For telecommunication companies to compete effectively for customers in the future, they will have to deploy a compelling set of services that include media. These services must at least equate if not exceed the performance of similar services on other networks such as provided by cable companies. It is with respect to these considerations and others that the present disclosure has been made.

SUMMARY

The present disclosure describes systems and methods for authenticated fast channel change of media provided over a local loop connection. Exemplary embodiments are provided.

According to one aspect of the disclosure, a method embodiment is provided for an authenticated, fast channel change for media such as video delivered over an Internet Protocol (IP) network to a customer. The embodiment allows channel changes to be made very quickly with validation at an access node. An example of an access node is a Digital Subscriber Line Access Multiplexer (DSLAM) that provides high speed access to a customer over which a channel is delivered. The reasons that a channel may not be available to the customer could be commercial, i.e., the customer may not have subscribed to or paid for the requested channel. It could also be because a lock has been placed on a requested channel to restrict its availability to the customer based upon either a time constraint or personal preferences. For example a child viewer may not be allowed by a customer to watch violent movies on a particular channel.

In accordance with another aspect of the disclosure, a method embodiment is provided for enabling fast access to at least one channel over an xDSL connection. At least one multicast enabled Digital Subscriber Line Access and Multiplexer (DSLAM) is employed to enable access to at least one channel on a core network. At least one subscriber is coupled to the core network by the xDSL connection. At a multicast enabled DSLAM, a request is received for at least one channel from a subscriber. The receiving DSLAM locally serves the xDSL connection for the subscriber. Information stored at the receiving DSLAM is employed to determine whether the subscriber is authorized to access the requested channel. If the subscriber is determined to be authorized to access the requested channel, the DSLAM is employed to provide access to the requested channel on the core network, establishes a single instance of each channel that is selectable by subscribers.

A further aspect of the disclosure is directed to providing at least one IGMP multicast protocol. Also, a set top box can be employed by the subscriber to provide an xDSL connection that is locally served by the receiving DSLAM. Additionally, the stored information can be included in a database at the receiving DSLAM.

A still further aspect of the disclosure is directed to providing each instance of each channel to the core network through a router coupled to another network. Also, a remote process may be employed to maintain the stored information. Additionally, a remote process can be employed to update the stored information.

Another aspect of the disclosure is directed to accessing the requested channel over the xDSL connection for the subscriber that is locally served by the receiving DSLAM. Also, the channel can include media for displaying, recording and playing with a set top box. Additionally, the media can include at least one of videos, graphics, pictures, text, talk shows, and television programs.

In accordance with yet another aspect of the disclosure, an apparatus, system and computer readable medium may be employed to practice substantially the same actions discussed above for the method.

DETAILED DESCRIPTION OF THE PREFERRED EMBODIMENTS

Figure 1:
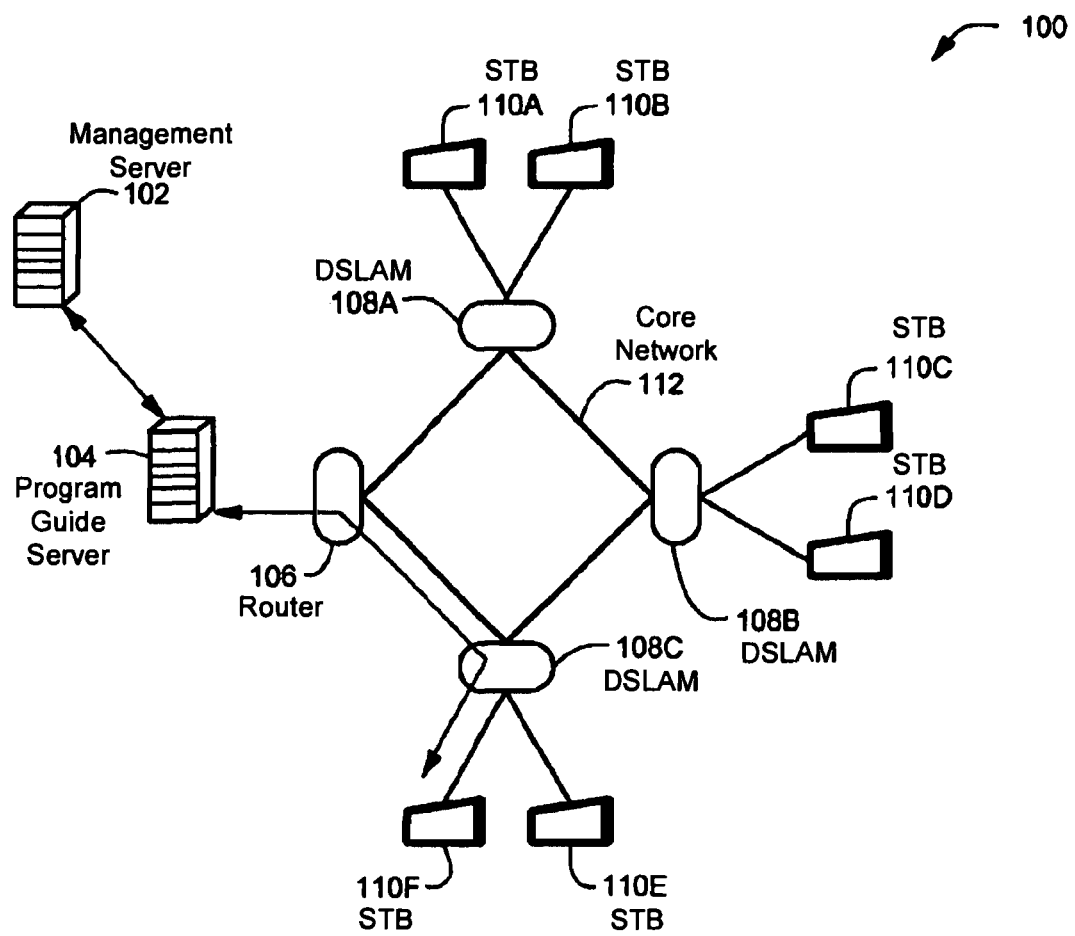
FIG. 1 illustrates a schematic diagram of an exemplary system for enabling a customer to change channels for media provided over an xDSL telephone line.

In the following detailed description of exemplary embodiments, reference is made to the accompanied drawings, which form a part hereof, and which show by way of illustration, specific exemplary embodiments by which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The term "packet" refers to an IP packet. The term "flow" means a flow of packets. The term "connection" refers to a flow or flows of packets that share a common path. The term "node" refers to a network element that interconnects one or more networks or devices. The term "user" refers to any person or customer such as a business or organization that employs a device to communicate or access resources over a network. The term "operator" refers to any technician or organization that maintains or services a packet-based network.

The term "router" refers to a dedicated network element that receives packets and forwards them to their destination. In particular, a router is used to extend or segment networks by forwarding packets from one logical network to another. A router typically operates at layer 3 and below of the Open Systems Interconnection (OSI) reference model for networking. However, some routers can provide additional functionality that operates above layer 3 of the OSI reference model.

The term "xDSL" refers to any version of a Digital Subscriber Line (DSL) that communicates packets between an end-user's modem and an access node, e.g., a Digital Subscriber Line Access Multiplexer (DSLAM), connected to a core network. The versions of DSL include Asynchronous DSL, Synchronous DSL, Rate DSL, Hybrid DSL, very high bit rate DSL and the like.

The term "core network" refers to any packet switched digital network. For example, Frame Relay, Asynchronous Transfer Mode (ATM) and Switched Megabit Data Service, and the like.

The term DSLAM refers to a Digital Subscriber Line Access Multiplexer which is employed to split the signals from multiple local xDSL loops into analog voice signals for a Public Switched Telephone Network (PSTN) and data signals for a core network.

The term set top box or "STB" refers to a device that enables a monitor, display screen, television, and the like, to become a user interface for a digital network such as a core network, the Internet, and the like. The set top box also enables the receiving and decoding of digital broadcasts for recording, playing and/or displaying.

Referring to the drawings, like numbers indicate like parts throughout the views. Additionally, a reference to the singular includes a reference to the plural unless otherwise stated or is inconsistent with the disclosure herein.

A method and system is provided for fast channel changes of media provided by carriers over an xDSL connection to a home. Each customer's subscriber information is stored at the DSLAM that supports the xDSL connection to the home. Also, each DSLAM supports multicast protocols so that only one instance of a channel is provided on the core network regardless of how many customers have requested access to the channel.

When a customer at home is viewing media on a television set that receives a wireless signal from a terrestrial TV station, the channel changes occur quickly. Typically, channel changes occur in one second or less. Also, when a customer is viewing a channel on a television set that receives a signal over a cable network, the channel changes are very fast as well. As a result, customers expect relatively rapid responses to channel change requests. As the number of media channels increases, it becomes even more difficult to ensure that channel changes remain fast for the customer.

Not all media channels are equal. Besides the obvious differences in the programming themes and the qualitative as well as subjective differences, some channels are considered premium channels. Premium channels carry a different cost structure for the customer. This cost structure could take the form of a different subscription price per time period (per week or per month) or may cost the viewer an additional charge for a single view. (Pay per view for a specific event). Different premium channels could be combined with standard channels to create different packages or subscription levels. A combination of a set of channels is often called a service package and is sometimes referred to as a subscription level. A service package can be a combination of any number of premium channels and standard channels. Some service packages can have no video channels as well.

To ensure that charges can be collected for service packages, service providers typically employ a service package validation system. For example, in the cable TV industry this validation package is referred to as a conditional access system (CAS). Another example is a smart card that is often used by service providers who deliver their packages over a Satellite downlink. Service package validation is well established in the cable TV industry as well as the satellite TV industry. With cable TV service packages, it is possible to rapidly change channels (channel surf) and validation can be performed quickly in real time. However, service package validation systems are less well known in the telecommunication industry.

For media service providers to effectively use wire-line access or wireless access to homes that is provided by a telephone carrier, a service package validation system is necessary. However, any service package validation system provided by a telephone carrier must process channel change requests as rapidly as those for terrestrial TV or cable TV systems. For telephone carriers, IP-based networks are a popular choice for communicating media to customers. Often the media is multicast from a single source in an effort to conserve bandwidth on a core network. Internet multicasting protocols are well defined as an international standard by the Internet Group Management Protocol (IGMP). See IETF RFC-2236, which is herein incorporated by reference.

While fast channel changes can be performed with IGMP protocols, it may not always be possible to quickly perform channel changes when the customer's request must first be authenticated and authorized. In the past, when media was distributed over an IP-based telephone carrier network using multicast methods, the authentication and authorization was separately processed by invoking explicit calls to an application level authorization agent or system. This separate processing often added significant delay in responding to channel change requests from customers.

FIG. 1 illustrates an overview of an exemplary system 100 for enabling a consumer to change/select media channels with set top boxes 110A-F over an xDSL telephone line. DSLAMs 108A-C are coupled to core network 112 and they support xDSL telephone lines that are coupled to respective local set-top boxes 110A-F. On another network (not shown), Program Guide Server 104 is coupled to router 106 and Billing and Subscriber Management Server 102. Additionally, the type of media that is provided by a channel may include, but is not limited to, video, graphics, pictures, music, text, talk shows, television programs, and the like.

In FIG. 1, a consumer has requested/changed a channel from set top box 110F. The channel request is received over an xDSL line by DSLAM 108C and conveyed to Program Guide Server 104 over core network 112 through router 106. Program Guide Server 104 processes the request by extracting a consumer Identification (ID) number and other characteristics of the request. Program Guide Server 104 requests Billing and Subscriber Management Server 102 to validate the channel request from the consumer. The Billing and Subscriber Management Server 102 determines if the consumer is validated to receive the requested channel and sends a validation response to Program Guide Server 104, which then either allows or disallows the change request based at least in part on the contents of the validation response.

Also, when the channel request is allowed, Program Guide Server 104 will provide the media for the requested channel to DSLAM 108C, which then delivers the requested channel's media to set top box 110F. Alternatively, if the request is denied by Program Guide Server 104, then the media is not provided to DSLAM 108C, which locally serves the consumer requesting a selected channel at set-top box 110F.

The associated time measures are the following: $T_C$—the time for the consumer device (set-top box) to send the request; $T_{CP}$—the transit time between the consumer and the DSLAM; $T_{DP}$—the transit time from the DSLAM to the Program guide server; $T_P$—processing time within the program guide server, $T_{PB}$—transit time between the program guide server and the Billing and Subscriber Data Processing server; $T_B$—the processing time within the Billing and Subscriber Data Processor, $T_{BP}$—the transit time from B to P; $T_{PD}$—the transit time from P to D; $T_{DC}$—the transit time from D to C; $T_{CS}$—the time required by C to establish the actions taken as result of the response. Thus, the total time taken to fulfill the consumer request is as follows:

$$T\text{ original} = T_c + T_{CD} + T_{DP} + T_P + T_{PB} + T_B + T_{BP} + T_{PD} + T_{DC} + T_{CS}.$$

Alternatively, the program guide displayed to the consumer could make available choices that have been pre-validated. Hence, any request that comes from the consumer can be assumed to be valid. For this case, the total time taken is represented by the equation as follows:

$$T\text{ alternative} = T_c + T_{CD} + T_{DC} + T_{CS}.$$

Also, there are two assumptions in this equation. First, the DSLAM is multicast enabled or that a multicast channel is available at the DSLAM. If the DSLAM is not multicast enabled then the request must be propagated as far as the program guide server or the video ingestion point. In this case the total time would increase to $T_C + T_{CD} + T_{DP} + T_P + T_{DC} + T_{CS}$. Second, the program guide server can remotely control the consumer device to send it updated information without it being requested by the consumer device.

The embodiment improves upon earlier solutions in at least two ways. First, each DSLAM is enabled for multicasting with IGMP. Second, channel requests from consumers are validated locally at the DSLAM serving a set-top box.

Figure 2A:
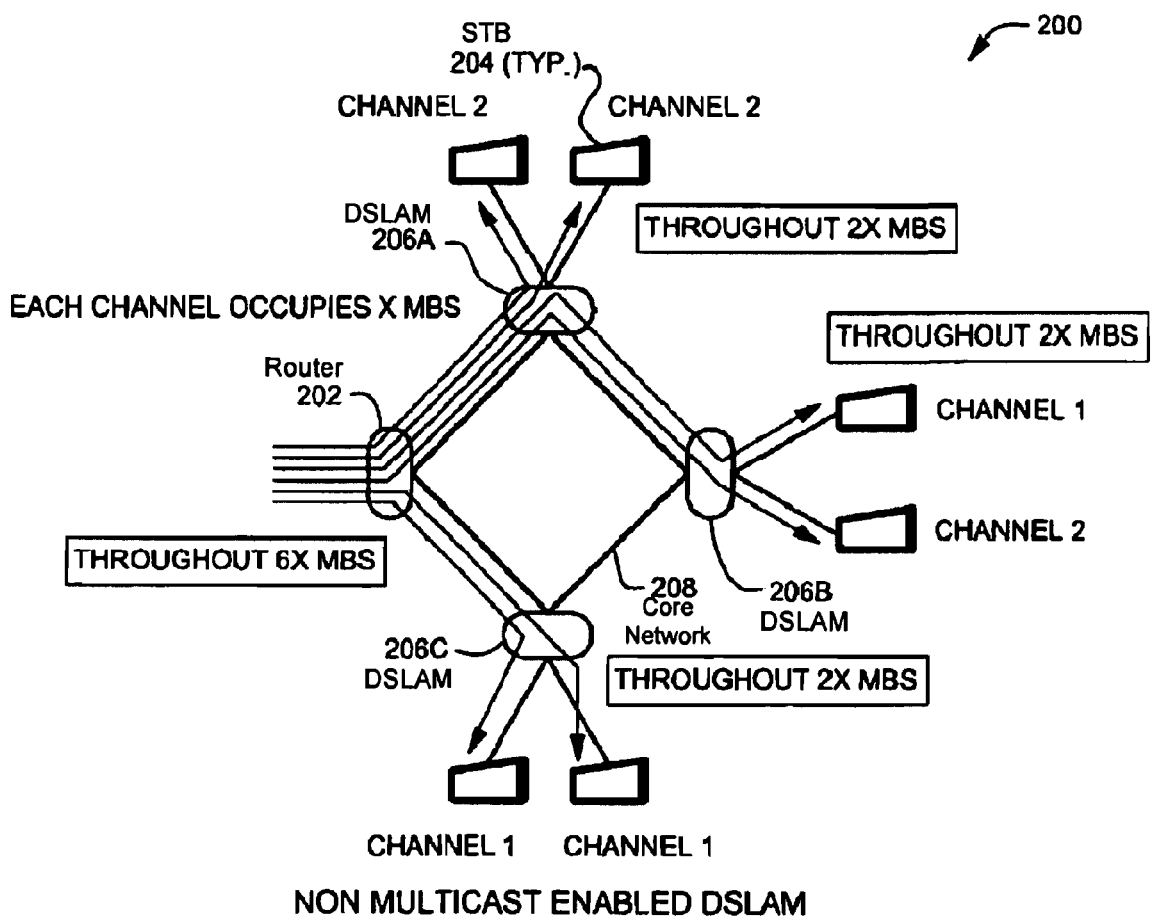
FIG. 2A shows a schematic diagram of an exemplary core network that includes non-multicast enabled DSLAMs.

FIG. 2A shows an exemplary system 200 where at least a portion of the disadvantages in using non-multicast DSLAMs 206A-C are illustrated. An exemplary system 200 enables a consumer to change/select media channels with set top boxes 204 over an xDSL telephone line. Non-multicast enabled DSLAMs 206A-C are coupled to core network 208 and they support xDSL telephone lines that are coupled to their respective local set-top boxes 204. On another network, a Program Guide Server is coupled to router 202 and a Billing and Subscriber Management Server. Although not shown, these servers operate in substantially the same manner as discussed in FIG. 1.

The throughput of media from another network (not shown here) to core network 208 at the media ingestion point, i.e., router 202, is directly proportional to the number of consumers requesting a channel at their set-top boxes 204 through their respective DSLAMs 206A-C. Even if two consumers served by the same non-multicast enabled DSLAM have requested the same channel, independent channels are established across the core network for each consumer to view that channel. In this case, a separate channel must be established for each consumer request, e.g., six set top boxes coupled to a core network through non-multicast enabled DSLAMs would require a six channel throughput at router 202 even if each set top box had requested the same channel.

Figure 2B:
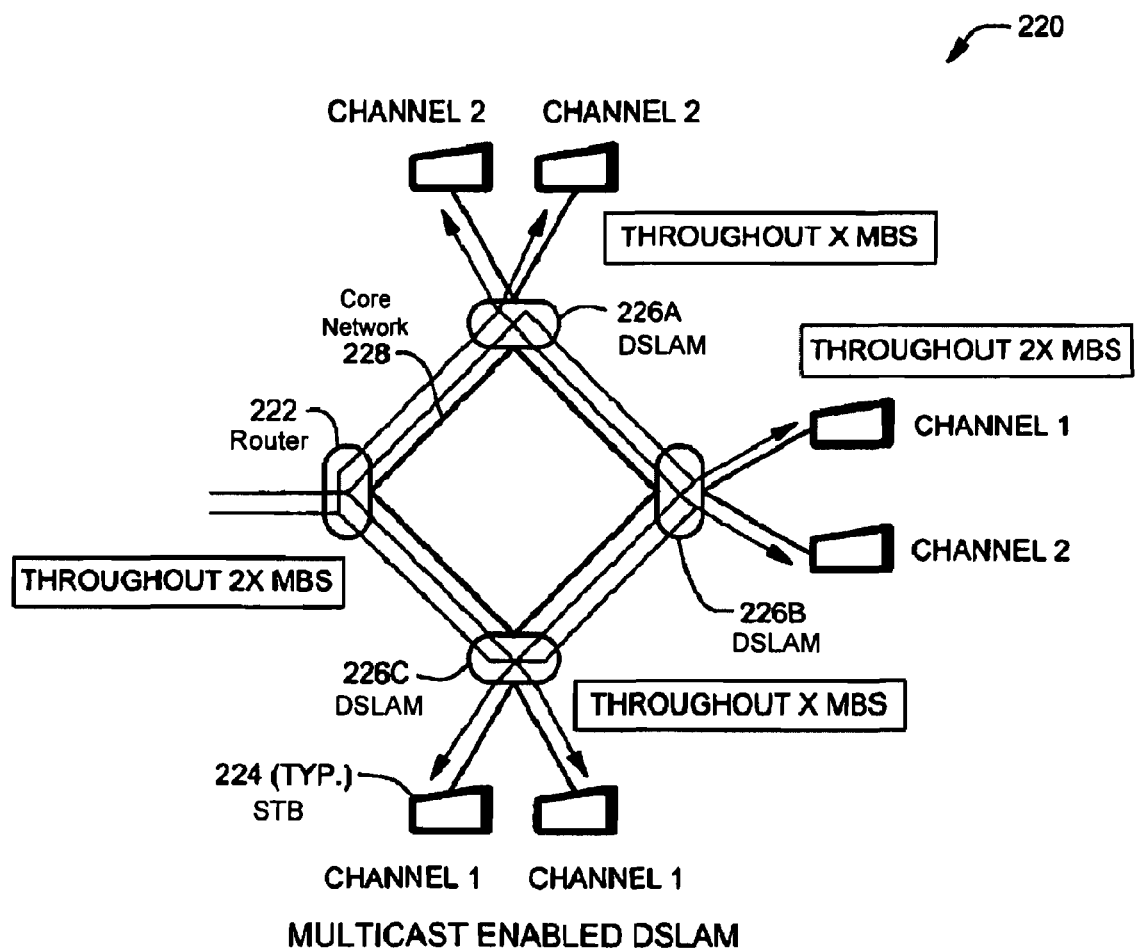
FIG. 2B illustrates a schematic diagram of an exemplary core network that includes multicast enabled DSLAMs.

An equation expressing this relationship is as follows:

(Core Network Utilization)$_{NOMULTICAST\_DSLAM} \alpha$.
The number of Active Consumers FIG. 2B illustrates an exemplary system where each DSLAM is multicast enabled. An exemplary system 220 enables a consumer to change/select media channels with set top boxes 224 over an xDSL telephone line. Multicast enabled DSLAMs 226A-C are coupled to core network 228 and they support xDSL telephone lines that are coupled to their respective local set-top boxes 224. On another network (not shown), a Program Guide Server is coupled to router 222 and a Billing and Subscriber Management Server. Although not shown, these servers operate in substantially the same manner as discussed in FIG. 1.

For this embodiment, there is no duplication of channel traffic across core network 228. Instead, the multicast enabled DSLAMs terminate a connection for each channel on core network 228 and then handle multicast requests among the consumers (set-top boxes 224) that it locally services. In this way, the throughput at the media ingestion point, i.e., router 222, and on core network 228 is directly proportional to the number of channels made available. For example, if six set top boxes are coupled to a core network through multicast enabled DSLAMs and each set top box is only requesting one of two different channels, only a two channel throughput is required at router 202 to provide media to the set top boxes 224.

Figure 3:
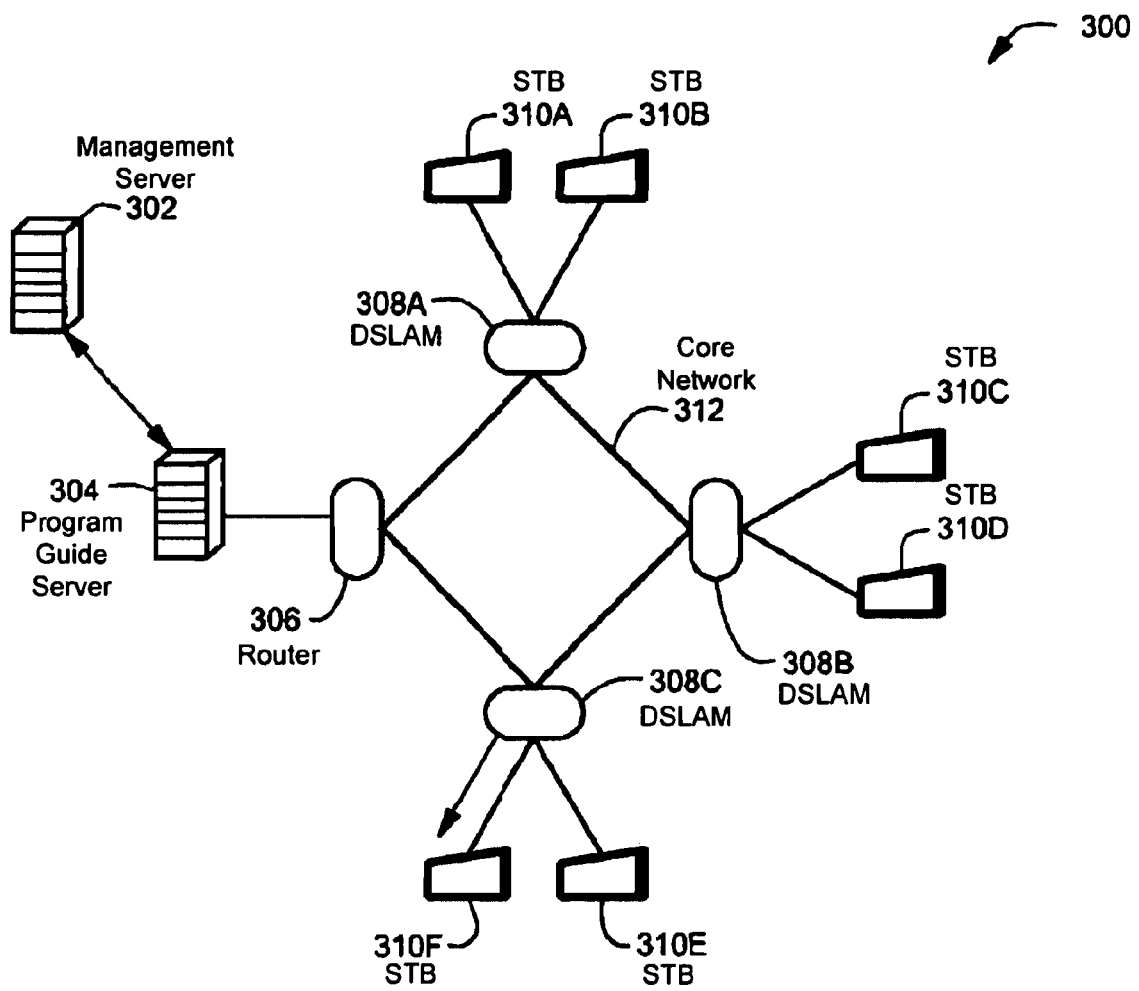
FIG. 3 shows a schematic diagram of an exemplary core network that includes multicast enabled DSLAMs that validate channel requests by customers.

An equation expressing the operation of this embodiment is as follows:

(Core Network Utilization)$_{MULTICAST\_DSLAM} \alpha$ The
number of Available Channels Typically, The number of Active Consumers>>The Number of active Channels FIG. 3 illustrates a combination of both the first and second improvements provided by the disclosure. In particular, the second improvement enables the consumer's requests from a set top box to be validated (authenticated/authorized) at the locally serving DSLAM, which is multicast enabled (supports IGMP). Subscriber information, billing information and additional information pertaining to the consumer is stored locally at the multicast enabled DSLAM. This information, in combination with a multicast facility in the DSLAM, enables a consumer's channel change request to be quickly evaluated, and if validated, almost immediately provide the media playing on the requested channel.

In FIG. 3, an overview of an exemplary system 300 is illustrated for enabling a consumer to change/select media channels with set top boxes 310A-F over an xDSL telephone line. Multicast enabled DSLAMs 308A-C are coupled to core network 312 and they support xDSL telephone lines that are coupled to respective local set-top boxes 310A-F. On another network, Program Guide Server 304 is coupled to router 306 and Billing and Subscriber Management Server 302. These servers operate in substantially the same manner as discussed in FIG. 1 except that they download the information necessary to validate and authorize a channel change request to each DSLAM in advance of the request.

In this embodiment, a channel change request from set top box 310F is propagated only as far as the locally serving and multicast enabled DSLAM 308C. Also, core network 312 only has to supply one instance of each requested channel instead of separate channels for each validated and approved request.

Hence, the total time for a channel change for the embodiment shown in FIG. 3 can be expressed in an equation as follows:

$$T_{NEW\_METHOD} = T_C + T_{CD} + T_{DC} + T_{CS}$$

While the total time to process a channel change request may at times be similar to some of the methods described above, the embodiment improves upon at least three vulnerabilities present in previous methods. In the embodiment, consumer/subscriber data that is used for authentication/validation is downloaded only as far as the DSLAM. The DSLAM is maintained and managed by the service provider such as a telephone carrier. The consumers do not have access to this information or to the management interfaces for the DSLAM. Hence it is difficult to illegally modify or hack the information for unauthorized access to media channels.

In contrast, previous methods have downloaded the data used for authentication/validation and authorization for channel changes to a device, e.g., set top box that resides in the consumer's premises, which can be vulnerable to hacking and/or unauthorized changes. In this case, an unscrupulous consumer (hacker) could apply hacking practices such as channel sniffing. In channel sniffing, the hacker runs a program that issues seemingly valid channel change requests using the well established multicast protocols in the hope that at least one of the requests specifies the right set of channel identifiers. With enough time, the hacker could establish what the correct channel identifiers are. Further, if the DSLAM is not validating the channel change requests, it will respond to any request that has the right data in it. Thus, channel sniffing attacks, and the like, can be reduced with the embodiment.

Additionally, previous methods relied upon a consumer identifier stored in a device such as a set top box at the consumer's premises. This method is not safe since this information can be spoofed. In contrast, the embodiment provides for authenticating/validating the consumer information based upon their access port on the DSLAM. Since the service provider maintains the access port information, it is easier to securely associate a subscription package with a specific consumer location.

Figure 4:
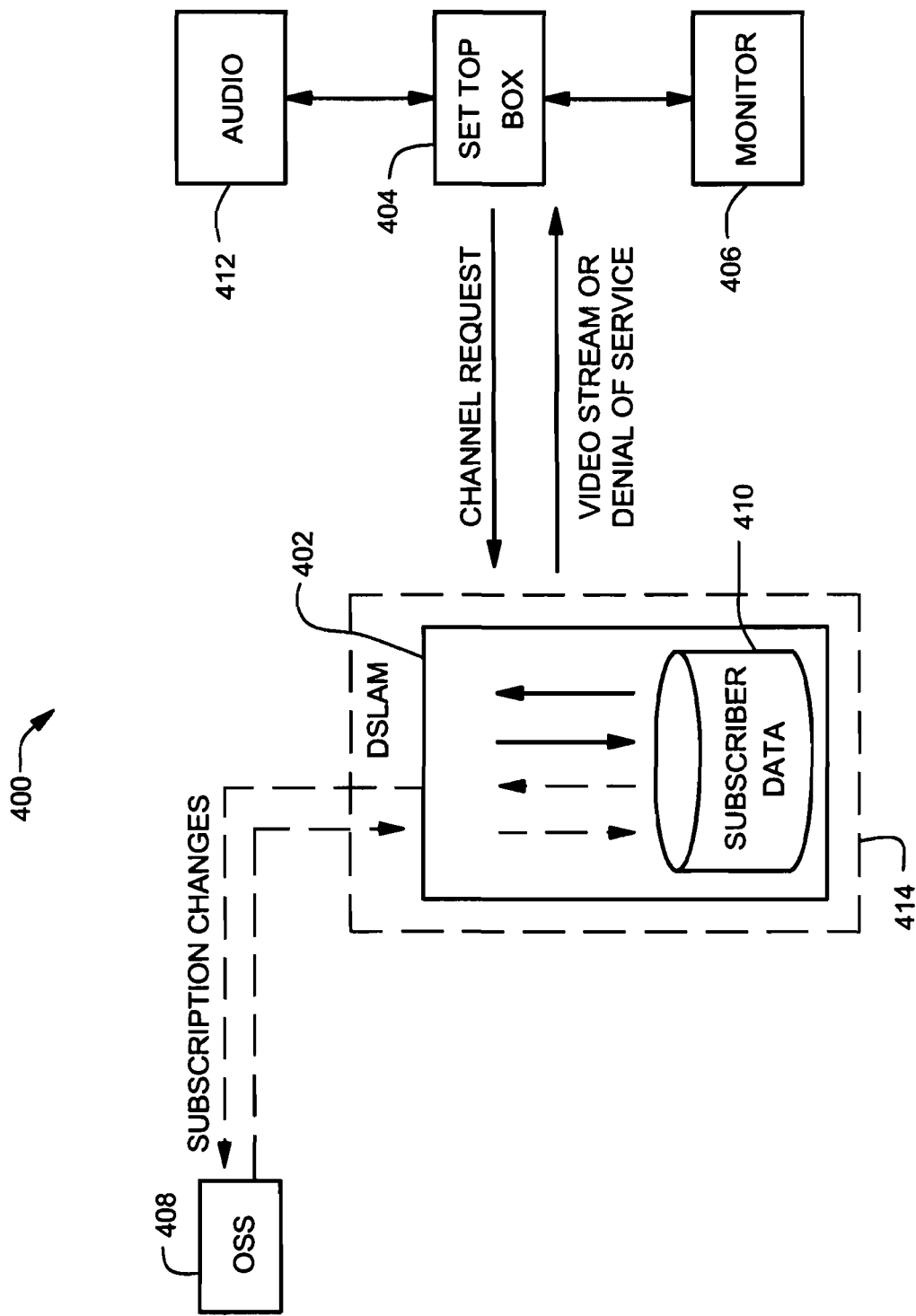
FIG. 4 illustrates a schematic diagram of an exemplary core network for the interaction of an OSS, DSLAM and STB.

FIG. 4 illustrates an overview 400 of one embodiment of the disclosure that includes at least two software components: an authentication module 402 that runs on IGMP enabled DSLAM 414 where this module authenticates consumer service requests; and an Operations Support System (OSS) module 408 that maintains the freshness of consumer authentication data stored on DSLAM 414 and is in communication with a remote application that processes authentication data for each DSLAM on a core network (not shown, but substantially similar to the system shown in FIG. 3).

In FIG. 4, DSLAM 414 is shown receiving a request for a media (video) channel from consumer's set top box (STB) 404 in the form of an IGMP request. In this example, monitor 406 is coupled to STB 404 to play media (video) on the requested channel. Also, audio interface 412 is coupled to STB 404 for playing audio signals on a requested channel.

Upon receipt of the channel change request, DSLAM 414 parses it and employs authentication module 402 to perform a look up function on authentication database 410 based on the STB's IP address or a suitable consumer identifier such as a port ID, and the channel's multicast address supplied in the content of the request. The consumer device identifier may be assumed to be valid and unique. In near real time, this information is checked against an STB identifier (e.g., a MAC address) and media service profile information cached in DSLAM 402.

If the consumer is authorized to receive the requested channel, a copy of this channel will be provided to STB 404 until such time another channel is selected. In the case where the consumer has not yet subscribed to the requested channel, a generic service denial message can be provided. Under most conditions, the transaction time from the STB to send the channel request and a response to be returned by the DSLAM will be less than 250 milliseconds when the present embodiment is employed.

As implied above, the consumer's channel privileges will be cached on multicast enabled DSLAM 414. An embodiment can provide a documented SNMP northbound interface to allow OSS application 408 to maintain the accuracy of this information. This embodiment will be capable of maintaining the information on an STB by STB basis. Changes to this information can be supported during run time, and this information can be stored in a hash table to maintain expeditious info retrieval rates.

Since the OSS component is typically remotely located, it could provide updates to the DSLAM on a per subscription change basis for each consumer. Under most circumstances, a service provider will wish to propagate subscription changes to the DSLAMs on the core network on a near real time basis. Therefore, when a consumer requests a new subscription for a channel or removal of an existing one, the OSS could immediately provide the changes to a DSLAM on the core network that is locally serving the consumer's STB. It is understood that the remote OSS application can send service change messages based on SNMP requests to the DSLAM for processing.

In one embodiment, the OSS module and/or its remote application can be written in the "JAVA" programming language for execution in the JAVA virtual runtime environment. In another embodiment, the DSLAM-based implementation of the authentication module would be coded in the C programming language and executed in the DSLAM's operating system.

Figure 5:
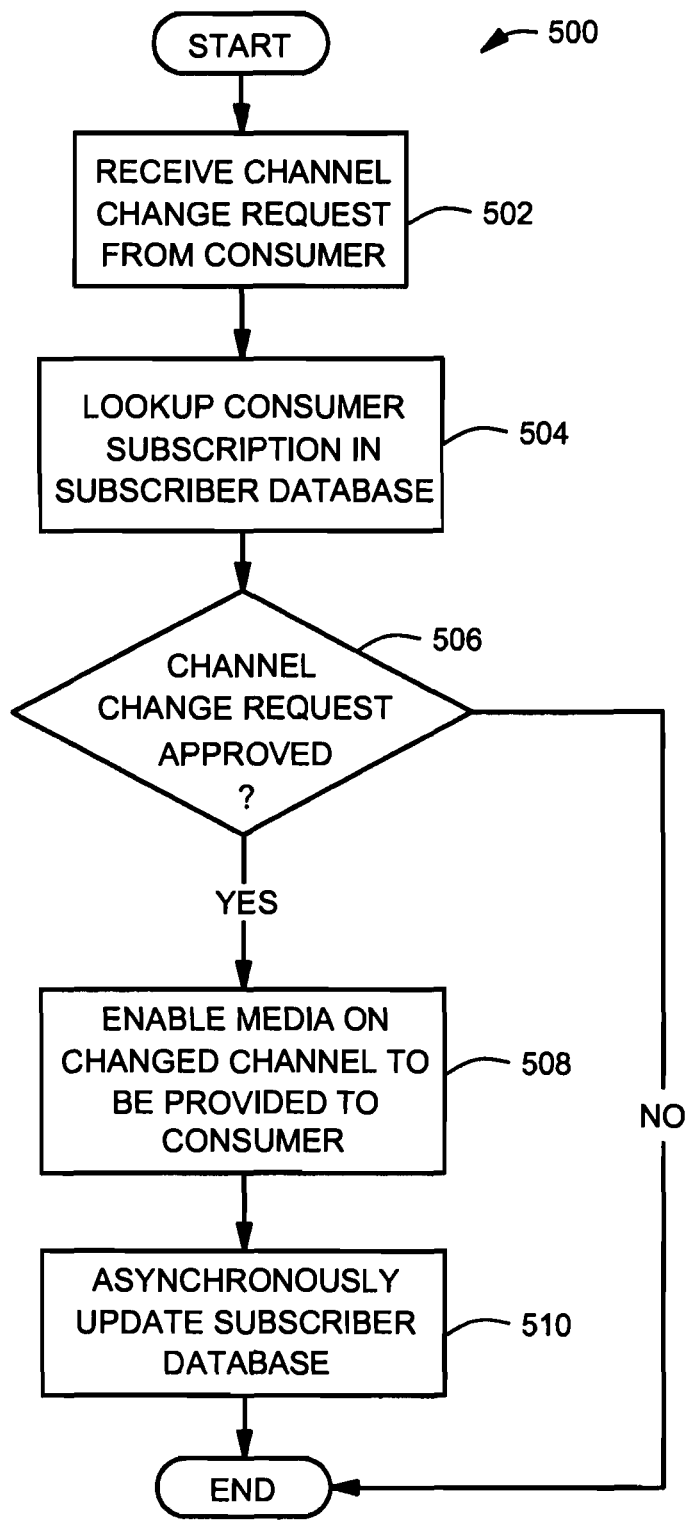
FIG. 5 shows a flow chart for an overview of the actions performed by the authentication module.

FIG. 5 illustrates an overview 500 of actions that are performed by the authentication module. Moving from a start block, the process advances to block 502 where a DSLAM-based authentication module parses a channel change request (IGMP request) that is received from a locally served set top box in a consumer's premises. The process flows to block 504 where the authentication module performs a lookup function on a subscriber database that is stored on the DSLAM that is locally serving the set top box. The process advances to decision block 506 where a determination is made whether the channel request is approved by the authentication module based at least in part on the consumer's privileges included in the locally stored subscriber database. If negative, the process jumps to an end block and returns to processing other actions.

However, if the determination at decision block 506 is true, the process advances to block 508, where the authentication module asynchronously receives subscriber database updates provided by the OSS module. Next, the process moves to an end block and returns to performing other actions.

Figure 6:
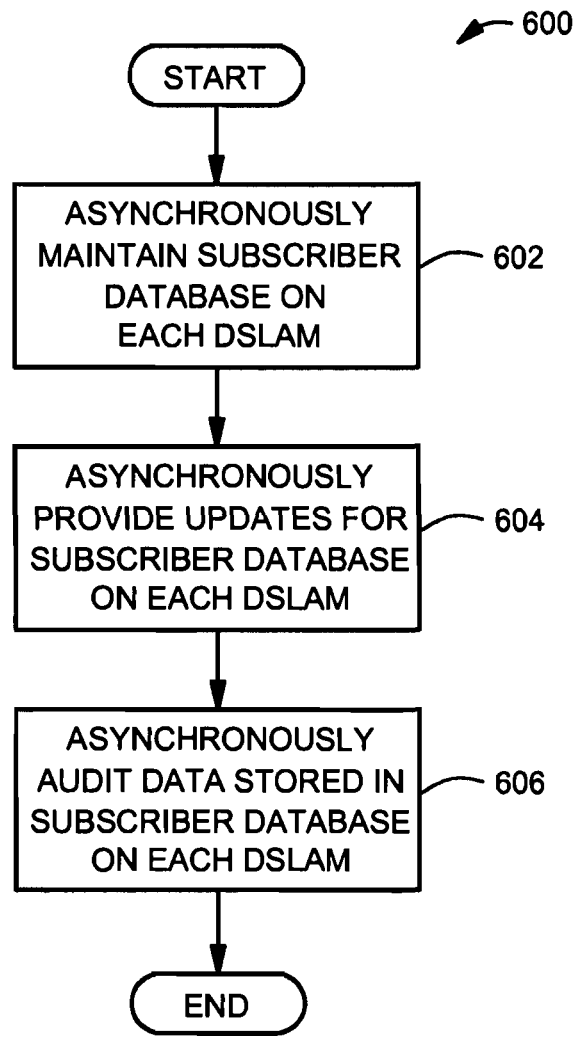
FIG. 6 illustrates a flow chart for an overview of the actions performed by the OSS module.

FIG. 6 illustrates an overview 600 of actions that are performed by the OSS module. Moving from a start block, the process advances to block 602 where the OSS module asynchronously maintains each subscriber database that is locally stored on a DSLAM. The process steps to block 604 where the OSS module provides subscriber updates to each DSLAM-based subscriber database when media service characteristics are added, changed, or deleted. The process flows to block 606 where the OSS module asynchronously audits the subscriber data stored in the subscriber database on each DSLAM. Next, the process moves to an end block and returns to performing other actions.

Figure 7:
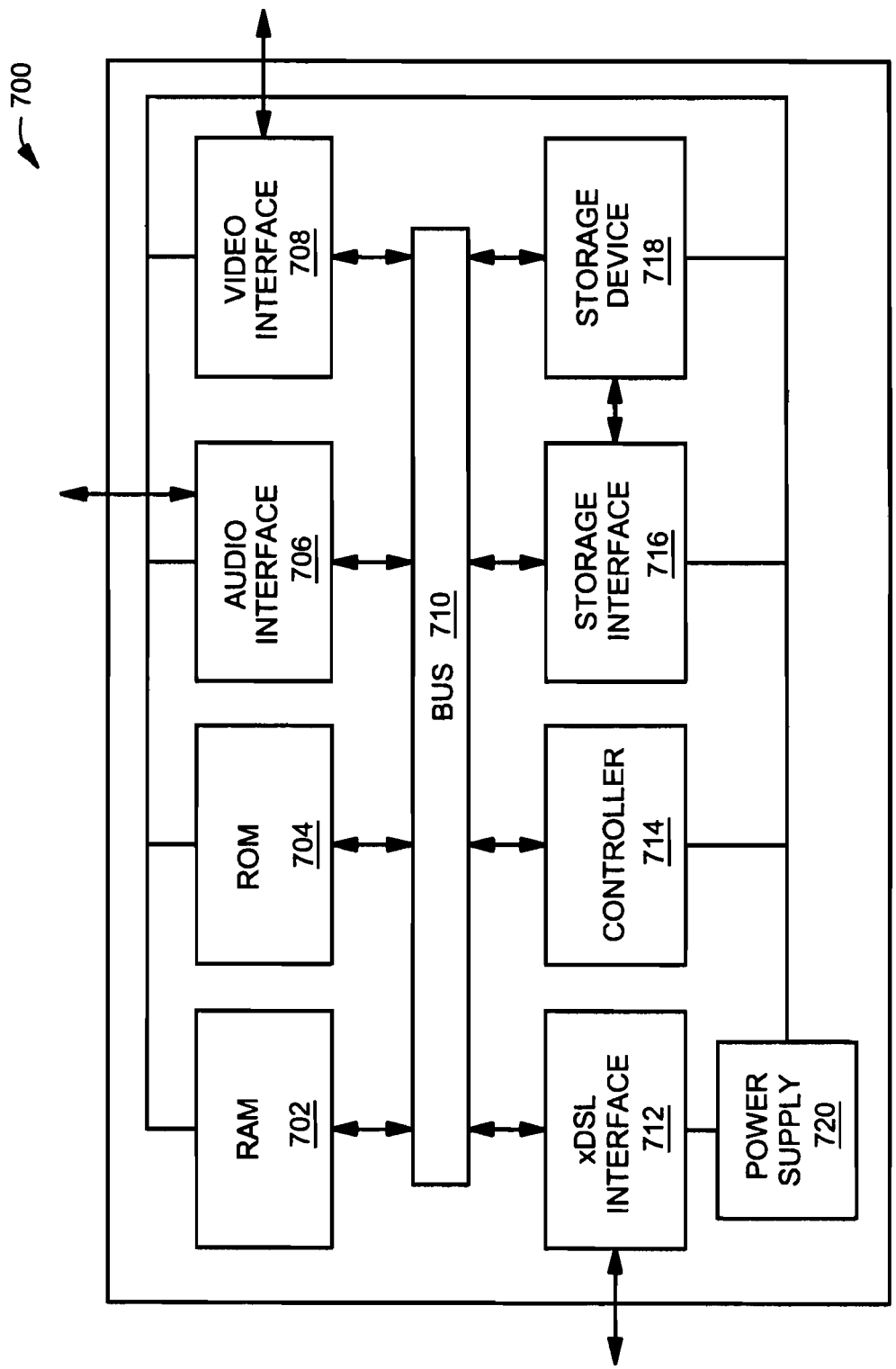
FIG. 7 shows a schematic diagram for an exemplary set top box.

FIG. 7 illustrates a schematic overview of an exemplary set top box (STB) 700. Power supply 720 provides electrical energy for the operation of each component included in STB 700. Bus 710 enables signals to be shared between several components including Read And write Memory (RAM) 702, wRite Once Memory (ROM) 704, audio interface 706, output interface 708, storage interface 716, controller 714 and xDSL interface 712. Programs and data for controlling the operation of STB 700 can be stored in RAM 702, ROM 704 and/or storage device 718, which is coupled to storage interface 716. Although not shown, xDSL interface 712 is also coupled via an xDSL loop to a locally serving DSLAM. Audio interface 706 may be employed to play and/or record at least audio media included in a channel selected by an operator/consumer.

Video interface 708 is employed to output video signals included in a channel selected by the operator/consumer. The outputted video signals can be provided in any one of several known formats for playing on a display device such as a monitor, display screen, television and the like.

Figure 8:
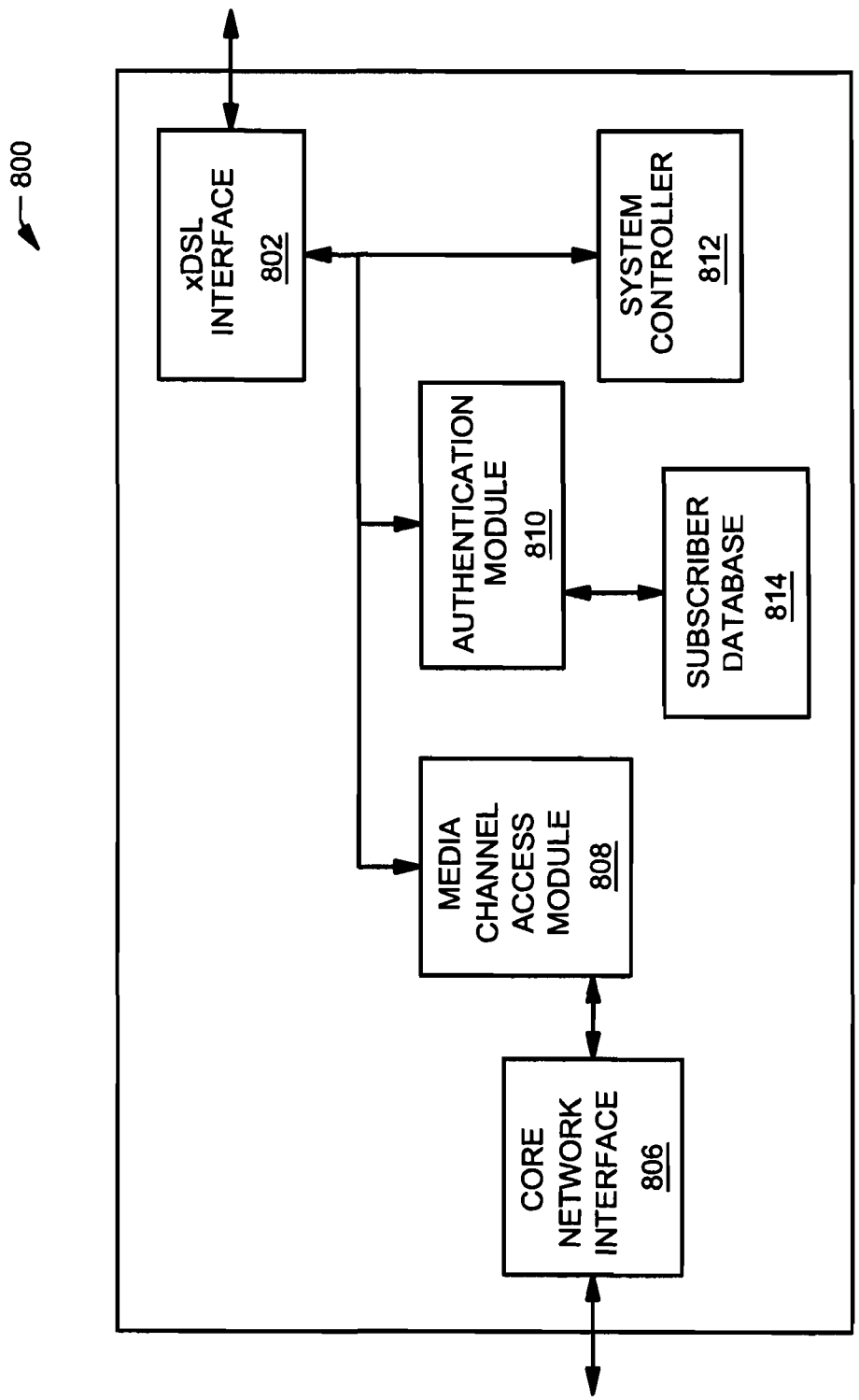
FIG. 8 illustrates a schematic diagram for an exemplary DSLAM, in accordance with the present disclosure.

FIG. 8 illustrates a schematic overview of an exemplary DSLAM 800. Core network interface 806 is employed to communicate with substantially the same core network discussed above and below. Multiple set top boxes (see FIG. 7) can be served via xDSL interface 802, which is coupled to the local xDSL loops for each consumer. Authentication module 810 performs substantially the same actions discussed above and below and is in communication with xDSL interface 802, system controller 812, subscriber database 814, and media channel access module 808. In concert, the operation and interaction of each of the components of DSLAM 800 enable the multicast functionality and local authentication of consumer channel change requests as discussed above and below.

The above specification, examples and data provide a complete description of the use and composition of exemplary embodiments of the present invention. Since many alternate embodiments of the invention can be made without departing from the spirit and scope of the present disclosure, the invention is limited only by the claims hereinafter appended.

What is claimed is:

1. A method for providing access to a media channel available on a core network from a multicast enabled access node, the method comprising:
   receiving, at the multicast enabled access node, a request for a media channel from a subscriber in signal communication with the access node over a local loop data connection;
   determining, in response to the request for the media channel, whether the subscriber is authorized to access the media channel based on subscriber authorization information previously stored at the access node for the subscriber without requesting the subscriber authorization information from the core network; and
   if the subscriber is determined to be authorized to access the media channel, enabling the subscriber to access the media channel over the local loop data connection using a multicast protocol.

2. The method of claim 1, further comprising distributing the media channel to the enabled subscriber over the local loop connection using a multicast protocol available at the access node.

3. The method of claim 1, further comprising providing an instance of the media channel to the core network through a router coupled to another network.

4. The method of claim 1, further comprising employing a remote process to maintain the subscriber authorization information.

5. The method of claim 1, further comprising receiving the subscriber authorization information from a remote process.

6. The method of claim 1 wherein the multicast enabled access node uses an Internet Group Membership Protocol (IGMP) multicast protocol.

7. The method of claim 1 wherein the subscriber authorization information is included in a database at the access node.

8. The method of claim 1 wherein the channel carries media for at least one of displaying, recording, or playing with a set top box.

9. The method of claim 1 wherein the media channel is made available at the access node in advance of selection by the subscriber.

10. The method of claim 1 wherein the multicast enabled access node is a Digital Subscriber Line Access Multiplexer (DSLAM).

11. The method of claim 10 wherein the media channel is made available at the access node in advance of selection by the subscriber.

12. The method of claim 10 wherein the multicast enabled access node is a Digital Subscriber Line Access Multiplexer (DSLAM).

13. An access node for enabling access to a media channel available on a core network, the access node comprising:
   a first network interface that employs a packet-based protocol to exchange packets with the core network;
   a second network interface for multiplexing a plurality of local loop connections, each local loop connection coupling a respective subscriber to the access node; and
   a transcoder that performs actions including:
      receiving a request for the media channel from a particular subscriber, if the particular subscriber is determined to be authorized to access the media channel, granting access to the media channel based on subscriber authorization information previously stored at the access node without requesting the subscriber authorization information from the core network in response to the request for the media channel, and
      distributing the media channel to the particular subscriber over a corresponding local loop connection using a multicast protocol available at the access node.

14. The access node of claim 13 wherein the multicast access is enabled using an Internet Group Membership Protocol (IGMP) protocol.

15. The access node of claim 13 wherein the subscriber authorization information is stored in a local database.

16. The access node of claim 13 wherein the media channel is made available at the access node in advance of selection by the subscriber.

17. The access node of claim 13 wherein the access node is a Digital Subscriber Line Access Multiplexer (DSLAM).

18. A system for enabling access to a media channel available on an Internet Protocol (IP) based core network, the system comprising:
   a multicast enabled access node having a database configured for storing subscriber authorization information;
   a set top box in signal communication with the access node via a local loop connection and configured for sending a request for a media channel from the subscriber to the multicast enabled access node over the local loop data connection; and
   a router configured to enable a core network to establish a single instance of the media channel that is selectable by subscribers authorized at the access node,
   wherein the access node is configured to determine whether the subscriber is authorized to access the media channel based on the subscriber authorization information previously stored at the access node, to enable an authorized subscriber to access the media channel on the core network by coupling the subscriber to the access node over a local loop data connection, and to distribute the media channel to the subscriber over the local loop data connection using a multicast protocol available at the access node.

19. The system of claim 18 wherein the multicast enabled access node is multicast enabled with Internet Group Membership Protocol (IGMP).

20. The system of claim 18 wherein the media channel is made available at the access node in advance of selection by the subscriber.

21. The system of claim 18 wherein the multicast enabled access node is a Digital Subscriber Line Access Multiplexer (DSLAM).

22. A multicast-enabled access node disposed for enabling access by a plurality of subscriber stations to a media channel from a core network, the multicast-enabled access node comprising:
   a first interface connected to the core network and configured to receive the media channel in advance of a request for the media channel from at least one of the plurality of subscriber stations;
   a second interface connected to a local loop connection and configured to receive the request for the media channel from the at least one of the plurality of subscriber stations;
   a decision portion coupled to the second interface and configured to determine whether the at least one of the plurality of subscriber stations is authorized to access the media channel based on previously stored information at the multicast-enabled access node; and
   a multicast portion coupled to both the first interface and the decision portion and configured to provide the at least one of the plurality of subscriber stations with access to the media channel over the local loop connection using a multicast protocol if the at least one of the plurality of subscriber stations is determined to be authorized to access the media channel.

* * * * *